(12) United States Patent
Coupechoux et al.

(10) Patent No.: US 7,302,230 B2
(45) Date of Patent: Nov. 27, 2007

(54) METHOD OF SELECTING OF A PATH TO ESTABLISH A TELECOMMUNICATION LINK

(75) Inventors: Marceau Coupechoux, Paris (FR); Vinod Kumar, Paris (FR)

(73) Assignee: Alcatel, Paris (FR)

( * ) Notice: Subject to any disclaimer, the term of this patent is extended or adjusted under 35 U.S.C. 154(b) by 427 days.

(21) Appl. No.: 10/766,803

(22) Filed: Jan. 30, 2004

(65) Prior Publication Data
US 2004/0185780 A1 Sep. 23, 2004

(30) Foreign Application Priority Data
Feb. 15, 2003 (EP) .................................. 03290368

(51) Int. Cl.
*H04B 15/00* (2006.01)
(52) U.S. Cl. .................. 455/62; 455/452.2; 455/453; 370/351; 370/254
(58) Field of Classification Search .................. 455/62, 455/452.2, 453, 445; 370/351, 255, 314, 370/254
See application file for complete search history.

(56) References Cited

U.S. PATENT DOCUMENTS

| | | | |
|---|---|---|---|
| 5,412,654 A * | 5/1995 | Perkins ....................... | 370/312 |
| 6,161,014 A | 12/2000 | Girardeau et al. | |
| 6,704,301 B2 * | 3/2004 | Chari et al. .................. | 370/351 |
| 6,845,084 B2 * | 1/2005 | Rangnekar et al. ......... | 370/254 |
| 7,006,453 B1 * | 2/2006 | Ahmed et al. ............... | 370/255 |
| 7,046,639 B2 * | 5/2006 | Garcia-Luna-Aceves et al. .......................... | 370/314 |
| 2004/0102192 A1 * | 5/2004 | Serceki ....................... | 455/434 |

FOREIGN PATENT DOCUMENTS

EP 0 615 391 A1 9/1994
WO WO 00/54539 A1 9/2000

OTHER PUBLICATIONS

Jiandong Li, "Performance Evaluation of Modified IEEE 802.11 MAC for Multi-Channel Multi-Hop Ad Hoc Network".
Shiann-Tson Sheu et al, "A Highly Reliable Broadcast Scheme for IEEE 802.11 Multi-Hop Ad Hoc Networks", 2002 IEEE, pp. 610-615.

* cited by examiner

*Primary Examiner*—Sanh D. Phu
(74) *Attorney, Agent, or Firm*—Sughrue Mion, PLLC

(57) ABSTRACT

The present invention relates to a method of selecting of a path to establish a communication link between a first node and one of a plurality of access points of a wireless cellular telecommunication system, the wireless cellular telecommunication system having second nodes being adapted to serve as relay nodes. The method comprises the steps of receiving of data from at least one of the second nodes, the data being indicative of a first quality measure of a first path from the one of the second nodes to its access point, comparing of a second quality measure of a second path from the first node to its access point with the first quality measure, selecting of the first path to replace the second path if the first quality measure is superior to the second quality measure.

15 Claims, 3 Drawing Sheets

METHOD OF SELECTING OF A PATH TO ESTABLISH A TELECOMMUNICATION LINK

This invention is based on a priority application EP 03 290 368.4 which is hereby incorporated by reference.

FIELD OF THE INVENTION

The present invention relates to the field of wireless cellular telecommunication systems, and more particularly without limitation, to IEEE 802.11, GSM, GPRS, UMTS and WLAN systems.

BACKGROUND OF THE INVENTION

Various wireless cellular telecommunication systems are known from the prior art, some of which have been standardized. A common feature of such wireless cellular telecommunication systems is that the network has a number of access points for coupling of mobile nodes to the wired backbone of the system. Each of the access points defines a cell having an assigned frequency in accordance with a certain frequency reuse pattern. In the case of GSM the access points are commonly referred to as "base transceiver stations" and in the case of UMTS the access points are commonly referred to as "node-Bs".

In addition, so called ad hoc networks have been investigated (cf. "performance evaluation of modified IEEE 802.11 MAC for multi-channel, multi-hop ad hoc network", $L_i$ et al, http://wnl.ece.cornell.edu/Publications/aina03.pdf, A highly reliable broadcast scheme for IEEE 802.11 multi-hop ad hoc networks, Shiann-Tsong Sheu, Yihjia Tsai, Jenhui Chen; Communications, 2002. ICC 2002. IEEE International Conference on Pages:610-615; 2002). It is to be noted that ad hoc networking is possible with the standard IEEE 802.11 only on a single frequency channel.

Ad hoc wireless networks are constructed by several mobile handsets or laptops and characterized by multi-hop wireless connectivity, constantly changing network topology and the need for efficient dynamic routing protocols. There is no stationary infrastructure or base station to coordinate packets transmissions and distribute the information of network topology. According to these characteristics, each mobile node in the multi-hop ad hoc networks must act as routers, relaying data packets to their neighboring mobile nodes. Since network resource is limited, any transmission will interfere the neighbors, which also have packets to transmit in the same radio channel.

For multi-channel, multi-hop, IEEE 802.11 ad hoc networks two basic methods are known: the Measurement-Based Method and the Status-Based Method. In the Measured-Based Method, a node is equipped with the capability to measure either the signal strength, the signal to noise ratio, or the signal to interference ratio. A node periodically scans each channel to find the channels with acceptable interference conditions. In the Status-Based Method, each node acquires the channels' Busy/idle status through listening to the MAC-layer control packets. Based on the channel status, an available channel is selected for use.

The present invention aims to provide an improved wireless cellular telecommunication system and an improved method and computer program for operating of such a telecommunication system.

SUMMARY OF THE INVENTION

The present invention provides for a method of selecting of a path to establish a telecommunication link between a first node and one of a plurality of access points of a wireless telecommunication system. In particular, the invention enables to extend the coverage of the wireless cellular telecommunication system by means of fixed or mobile relay nodes, which are used to couple nodes, which are outside the coverage area of the access points to the telecommunication system. Further the invention enables to select the path for the coupling of the node which is outside the coverage area on the level of the node, based on signalling data received from neighboring relay nodes.

In accordance with a preferred embodiment of the invention the selection of the path is made in order to minimize the path length. In addition or alternatively, other path selection criteria can be used.

When a node decides to replace its existent path to an access point of the wireless cellular telecommunication system by another path having a higher quality measure, the existing telecommunication link is switched from the frequency of the existing path to the frequency of the new path. This is especially useful when the node is a mobile node, which is moved outside of the coverage area of the access points of the wireless cellular telecommunication system as this enables to maintain the telecommunication link when the telecommunication paths are exchanged.

In accordance with a further preferred embodiment of the invention the node scans the frequencies, which are used by the various access points in order to receive data packets from neighboring second nodes, which could serve as relay nodes. The data packets contain an indication of the number of hops from the neighboring nodes to an access point of the wireless cellular telecommunication system or an alternative quality measure. For example, if one of the other nodes has a path with a number of hops, which is smaller than the number of hops of the path, which is currently used by the mobile node, the mobile node can select the path of the other nodes as a replacement for its current path.

In accordance with a further preferred embodiment of the invention one of the frequencies of the cellular telecommunication system is used in order to signal the amount of hops from the nodes to the access points between the nodes. This way it can be avoided that all the frequencies need to be scanned with the drawback that some kind of synchronisation of the nodes is required.

It is to be noted that the present invention is particularly advantageous to extend the coverage of a wireless cellular telecommunication system in a flexible way. Nodes outside the coverage of the wireless cellular telecommunication system can be coupled to an access point of the system through one or more relay nodes. The relay nodes can be special fixed nodes, which only have a relay function. Alternatively any mobile subscriber equipment, such as a mobile phone or laptop computer, having a wireless air interface can act as a relay node.

BRIEF DESCRIPTION OF THE DRAWINGS

In the following preferred embodiments of the invention will be described in greater detail by making reference to the drawings in which.

DETAILED DESCRIPTION

Figure 1:
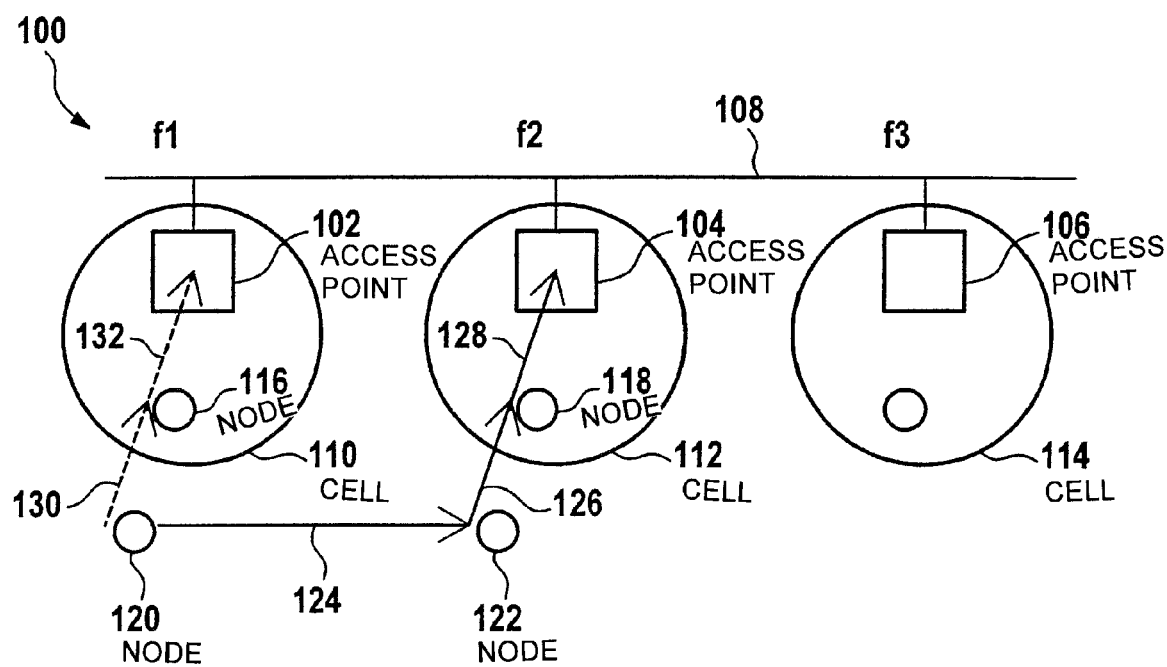
FIG. 1 is a block diagram of a wireless cellular telecommunication system having a number of access points.

FIG. 1 shows telecommunication system 100 having a number of access points 102, 104, 106, . . . which are coupled by a wired backbone 108 of telecommunication system 100. Each one of the access points 102, 104, 106, . . . defines a cell 110, 112, 114, . . . respectively. Further telecommunication system 100 has a set of frequencies f0, f1, f2, . . . Each one of the access points 102, 104, 106, . . . operates on one of the frequencies of the set of frequencies.

For example, frequency f1 is used by access point 102 and frequency f2 is used by access point 104. A number of frequency reuse schemes can be used for assignment of frequencies to access points. For example, node 116, which is located within the coverage zone of cell 110, can directly communicate with access point 102 on frequency f1. Likewise node 118 within the coverage of cell 112 can directly communicate with access point 104 on frequency f2.

Nodes 120 and 122 outside the coverage of anyone of the cells 110, 112, 114, . . . can not directly communicate with anyone of the access points 102, 104, 106, . . . of telecommunication system 100. To extend the coverage of telecommunication system 100 node 122 serves as a relay node to provide a path consisting of the path segments 124, 126 and 128 to establish a telecommunication link between node 120 and access point 104. For this telecommunication link the frequency f2 of access point 104 is utilized. Node 122 can be a fixed relay node or it can be a mobile node, such as a mobile phone or other wireless electronic device.

When mobile nodes are used as relay nodes ad hoc relay networks are formed in order to couple source node 120 to one of the access points.

All of the active nodes of telecommunication system 100 send out data packets on one of the frequencies of the set of frequencies of the telecommunication system. These data packets are sent directly to one of the access points or through intermediary relay nodes. When the telecommunication link is formed through one ore more relay nodes each of the data packets indicates the number of hops or relay nodes in the path from the node to the access point. Preferably, the number of hops or relay nodes is included in all MAC packets and not only data packets.

For example, if node 122 sends out a data packet, the data packet indicates that there are two hops, i.e. node 118, in the path to the access point 104. When the data packet is received by node 118 this value is decremented and the data packet is forwarded to the next node, which in this case is access point 104. In case of low traffic, we special control packets can be used to broadcast the number of hops.

For example, the number of hops can be included in the media access control (MAC) header portion of a data packet.

Node 120 "listens" to the data packets, which it can receive from neighboring nodes, i.e. nodes 116 and 122, on the various frequencies. A data packet received by node 120 from node 116 indicates that node 116 is directly communicating with its access point 102 as there is one hop between node 116 and access point 102. In comparison, the path, which is currently used by node 120, has three hops in order to reach access point 104. In order to minimize the number of hops node 120 therefore decides to replace to current path by the path consisting of path segments 130 and 132 between node 120 and relay node 116 to access point 102.

Alternatively, frequency f0 of the set of frequencies is used for signalling the number of hops from a node to its access point between the nodes. In this instance all of the active nodes of telecommunication system 100 send out signalling data packets after certain time intervals in synchronism and/or in defined time windows in order to exchange information regarding the number of hops from a given node to its access point. These data packets, which are received by a node outside the coverage area from its neighboring nodes, can be used by the first node to re-evaluate its common selection of a path for the telecommunication link to one of the access points.

Figure 2:
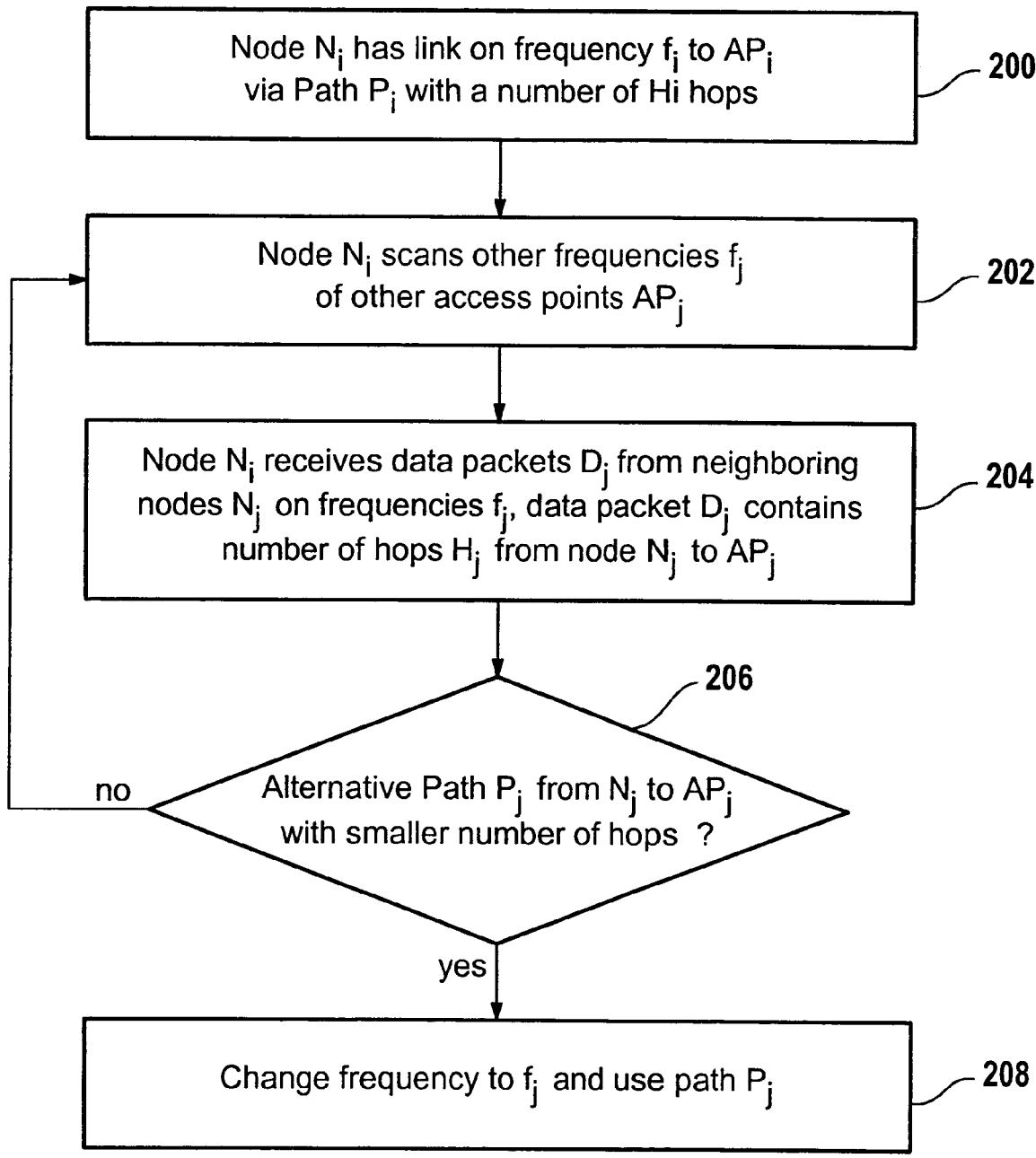
FIG. 2 is illustrative of a first mode of operation of the telecommunication system of FIG. 1.

FIG. 2 shows a corresponding flow chart. Initially, one of the nodes $N_i$ which is located outside the coverage of anyone of the cells of the wireless cellular telecommunication system has a telecommunication link to one of the access points $AP_i$ on frequency $f_i$ via path $P_i$ with a number of $H_i$ hops. In step 202 node $N_i$ scans the other frequencies $f_j$ of the set of frequencies of the telecommunication system, which are assigned to other access points $AP_j$. This scanning can be performed at regular time intervals.

Alternatively, the duration of the time intervals between the scanning of the frequencies is adapted to the quality of the current path $P_i$. For example, if the number $H_i$ of hops is used as a quality measure, no scanning is performed if $H_i=0$ as in this instance the quality of the path cannot be improved anymore.

In contrast, if the number $H_i$ of hops is large a higher quality alternative path should be identified quickly such that the scanning of the frequencies is performed more frequently. For example, the time intervals between the frequency scans can be selected inversely proportional to the number of hops $H_i$ of the current path $P_i$.

In step 204 node $N_i$ receives data packets $D_j$ from one or more of its neighboring nodes $N_j$ on frequencies $f_j$. Each one of the data packets contains the number of hops from the node $N_j$ that has sent out the data packet to the access point $AP_j$ of that node. This way node $N_i$ is informed about the number of hops which are required to go from each one of its surrounding neighboring nodes $N_j$ from which one it can receive the data packets $D_j$ to one of the access points.

In step 206 the node $N_i$ makes a decision regarding its path selection. If an alternative higher quality path $P_j$ can be established using one of the surrounding neighboring nodes $N_j$ as a relay node the current path $P_i$ is replaced by the alternative path $P_j$. This is done in step 208. If such an alternative higher quality path $P_j$ is not available the control goes from step 206 back to step 202 in order to perform the scanning of the frequencies after a certain time interval.

Figure 3:
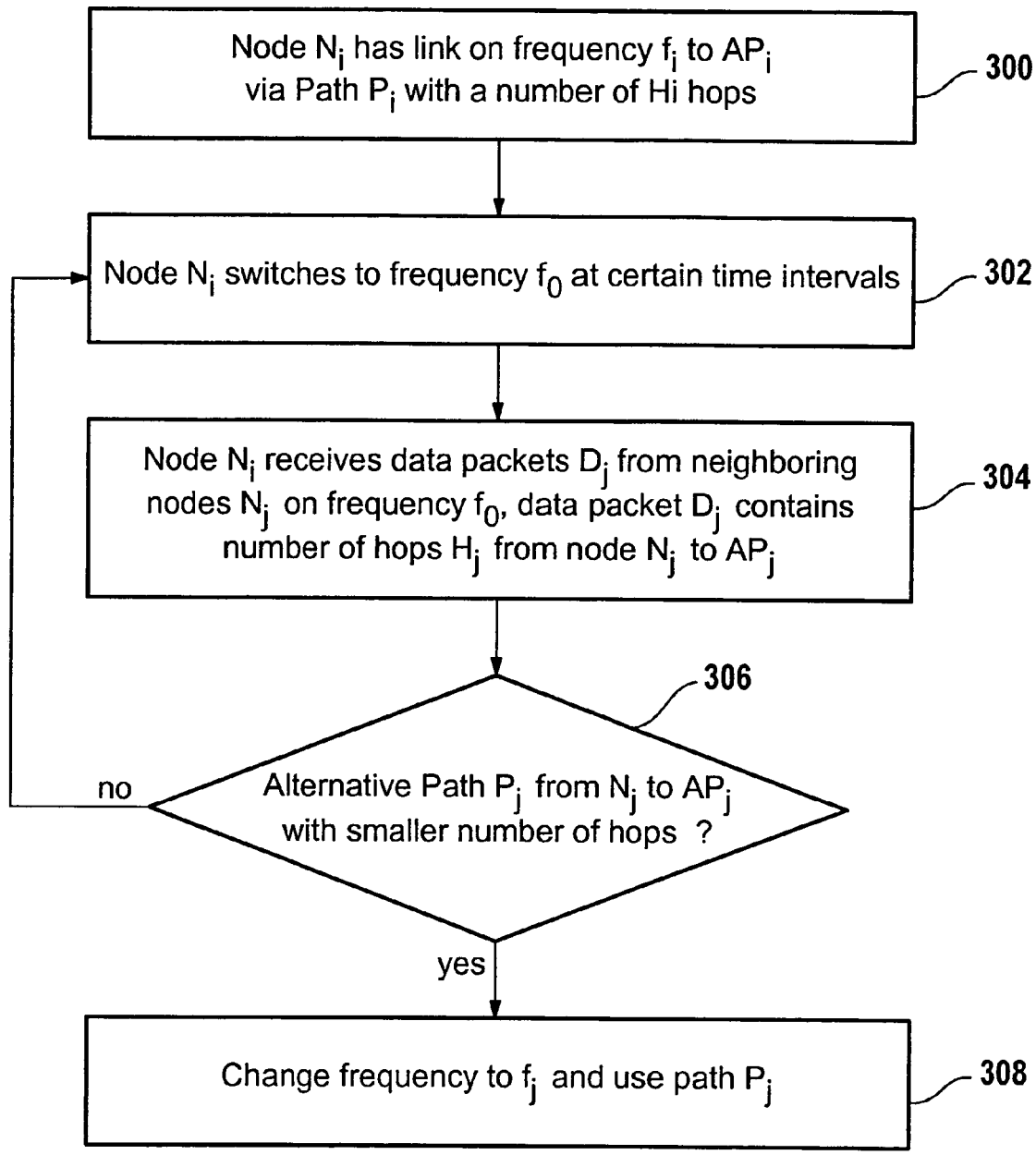
FIG. 3 is illustrative of a flow chart of a second mode of operation of the telecommunication system of FIG. 1.

FIG. 3 is illustrative of an alternative mode of operation. Step 300 is equivalent to step 200 of FIG. 2. In step 302 node $N_i$ switches to frequency $f_0$, which is a predefined one of the frequencies of the frequency set. In synchronism with node $N_i$ or within the same time window all the other nodes of the wireless cellular telecommunication system also switches to frequency $f_0$.

All of the nodes send out data packets $D_j$ containing an indication of the number of hops from the node to its access point. This way the same data is provided in step 202 of FIG. 2 without the need to scan all the frequencies. However, the alternative mode of operation of FIG. 3 works best if the nodes are synchronized.

The following steps 304 and 306 and 308 are similar to the respective steps 204, 206 and 208 of FIG. 2.

List of Reference Numerals 100 telecommunication system
102 access point
104 access point
106 access point
108 back bone
110 cell
112 cell
114 cell
116 node
118 node
120 node
122 node
124 path segments
126 path segments
128 path segments
130 path segments
132 path segments

The invention claimed is:

1. A method of selecting of a path to establish a communication link between a first node and one of a plurality of access points of a wireless cellular telecommunication system, the wireless cellular telecommunication system having second nodes being adapted to serve as relay nodes, the method comprising the steps of:
   receiving of data from at least one of the second nodes, the data being indicative of a first quality measure of a first path from the one of the second nodes to its access point,
   comparing of a second quality measure of a second path from the first node to its access point with the first quality measure,
   selecting of the first path to replace the second path if the first quality measure is superior to the second quality measure.

2. The method of claim 1, whereby the wireless cellular telecommunication system is a network utilizing an IEEE 802.11 standard, a GSM standard, a UMTS standard and a WLAN standard.

3. The method of claim 1, further comprising scanning of a set of frequencies by the first node to receive the data.

4. The method of claim 3, whereby the scan is performed repeatedly after certain time intervals, whereby the length of the time intervals is adapted to the second quality measure.

5. The method of claim 1, whereby the first and the second quality measures depend on a number of hops in the first path and in the second path, respectively.

6. The method of claim 1, whereby the data is received by the first nodes on a pre-defined frequency.

7. A computer program product for selecting of a path to establish a telecommunication link between a first node and one of a plurality of access points of a wireless cellular telecommunication system, the wireless cellular telecommunication system having second nodes being adapted to serve as relay nodes, comprising program means for performing the steps of:
   inputting of data which have been received from at least one of the second nodes, the data being indicative of a first quality measure of a first path from the one the second nodes to its access point,
   comparing of a second quality measure of a second path from the first node to its access point with the first quality measure,
   selecting of the first path to replace the second path if the first quality measure is superior to the second quality measure.

8. A mobile node for a wireless cellular telecommunication system, the wireless cellular telecommunication system having second nodes being adapted to serve as relay nodes, a first node of the telecommunication system comprising means for selecting of a path to establish a telecommunication link to one of a plurality of access points of the wireless cellular telecommunication systems by the steps of:
   receiving of data from at least one of the second nodes, the data being indicative of a first quality measure of a first path from the one of the second nodes to its access point,
   comparing of a second quality measure of a second path from the first node to its access point to the first quality measure,
   selecting of the first path to a replace the second path if the first quality measure is superior to the second quality measure.

9. The mobile node of claim 8, whereby the first and second quality measures depend on the number of hops in the first path and in the second path to the respective access points.

10. A wireless cellular telecommunication system having a plurality of access points, a first node and a plurality of second nodes being adapted to serve as relay nodes, the first node comprising means for performing the steps of:
   receiving of data from at least one of the second nodes, the data being indicative of a first quality measure of a first path from the one of the second nodes to its access point,
   comparing of a second quality measure of a second path from the first node to its access point with the first quality measure,
   selecting of the first path to replace the second path if the first quality measure is superior to the second quality measure.

11. The method according to claim 1, wherein the comparing comprises comparing the second quality measure of the second path, from the first node to the access point of the first node, with the first quality measure of the first path, from the second node to the access point of the second node.

12. The method according to claim 1, wherein the access point comprises one of a base transceiver station and a node-B.

13. The method according to claim 1, wherein said second node comprises a wireless relay node.

14. The method according to claim 1, wherein the method comprises selecting the path to establish the communication link between the first node and one of among the plurality of access points of a wireless cellular telecommunication system.

15. The method according to claim 1, wherein the access point of the at least one of the second nodes, which is a first access point, is different from the access point of the first node, which is a second access point.

* * * * *